United States Patent [19]
Park

[11] Patent Number: 5,980,046
[45] Date of Patent: Nov. 9, 1999

[54] PROJECTOR WITH ILLUMINATING LIGHT COLLECTING UNIT

[75] Inventor: Jong-Bae Park, Suwon, Rep. of Korea

[73] Assignee: Samsung Electronics Co., Ltd., Kyungki-do, Rep. of Korea

[21] Appl. No.: 09/025,853

[22] Filed: Feb. 19, 1998

[30] Foreign Application Priority Data

Feb. 19, 1997 [KR] Rep. of Korea ........................ 97-4924

[51] Int. Cl.[6] .................................................. G03B 21/14
[52] U.S. Cl. .............................. 353/122; 353/102; 362/32
[58] Field of Search ........................... 353/102, 38, 122; 349/62, 61; 359/894; 385/146, 33, 35, 133, 901, 123; 362/307, 308, 311, 326, 327, 328, 339, 268, 32

[56] References Cited

U.S. PATENT DOCUMENTS

| | | | |
|---|---|---|---|
| 5,059,013 | 10/1991 | Jain | 385/146 |
| 5,303,084 | 4/1994 | Pfibsen et al. | 385/133 |
| 5,594,561 | 1/1997 | Blanchard | 385/901 |
| 5,625,738 | 4/1997 | Magarill | 359/894 |
| 5,634,704 | 6/1997 | Shikama et al. | 353/102 |
| 5,795,049 | 8/1998 | Gleckman | 353/122 |

*Primary Examiner*—William C. Dowling
*Attorney, Agent, or Firm*—Sughrue, Mion, Zinn, Macpeak & Seas, PLLC

[57] ABSTRACT

A liquid crystal projector with an illuminating light collecting unit which can efficiently collect illuminating light emitted from a lamp of the projector to a scrambler. The projector with an illuminating light collecting unit, includes: a lamp for emitting illuminating light; a reflector for reflecting the illuminating light; a rod-shaped scrambler for guiding the reflected illuminating light to pass therethrough; an illuminating light collecting unit for collecting and diffusing the reflected illuminating light in order to prevent the fluctuation of the illuminating light which may occur at a region between the scrambler and the lamp; and a projection lens for projecting the illuminating light which has passed through the scrambler.

4 Claims, 3 Drawing Sheets

PROJECTOR WITH ILLUMINATING LIGHT COLLECTING UNIT

BACKGROUND OF THE INVENTION

1. Field of the Invention

The present invention relates to a liquid crystal projector with an illuminating light collecting unit which can efficiently collect illuminating light emitted from a lamp of the projector to a scrambler.

2. Description of the Related Art

In general, a projector serves to enlarge a small image displayed on a cathode ray tube or a liquid crystal display panel to a large image by using direct or indirect projection technique through an optical instrument so that the large image is projected onto a screen.

The direct projection technique is referred to as a forward projection and the projector which is used therefor is disposed separately from a cabinet in order to project the image directly onto a screen.

The indirect projection technique is referred to as a backward projection and the projector forming the optical instrument is disposed inside the cabinet so that illuminating light is projected onto the screen via a reflection mirror which is disposed to face backward.

FIG. 1 shows a conventional device in connection with the optical elements employed at the projector.

In FIG. 1, illuminating light 1a emitted from a lamp 1 is reflected by a hemisphere-shaped reflector 2 and is directed into a rod-shaped scrambler 3 which is made of glass thereby to be passed therethrough. Subsequently, the illuminating light 1a is projected onto the screen to be enlarged via a projection lens or a liquid crystal display panel not shown.

The conventional optical device uses a Metal Halide Lamp 1 which operates by an arc discharge as a light source.

As shown in FIG. 2, however, when illuminating light 1a emitted from the lamp 1 passes the scrambler 3, the position of the light 1a being collected or converged to the scrambler 3 may minutely fluctuate at a longitudinal or transverse direction due to an arc sparking thereby causing an increase of the loss of light.

This causes the brightness of the screen to be changed.

SUMMARY OF THE INVENTION

An object of the present invention is to provide a projector with an illuminating light collecting unit in which illuminated light emitted from a lamp is efficiently directed to a scrambler thereby to reduce the loss of light.

To achieve the object, the present invention provides a projector with an illuminating light collecting unit, including: a lamp for emitting illuminating light; a reflector for reflecting the illuminating light, the reflector being surrounded by the lamp; a rod-shaped scrambler for guiding the reflected illuminating light to pass therethrough; an illuminating light collecting unit for collecting and diffusing the reflected illuminating light in order to prevent the fluctuation of the illuminating light which may occur at a region between the scrambler and the lamp; and a projection lens for projecting the illuminating light which has passed through the scrambler.

BRIEF DESCRIPTION OF THE DRAWINGS

The above objects, and other features and advantages of the present invention will become apparent after a reading of the following description taken in conjunction with the accompanying drawings, in which.

DETAILED DESCRIPTION OF THE PREFERRED EMBODIMENT

Figure 1:
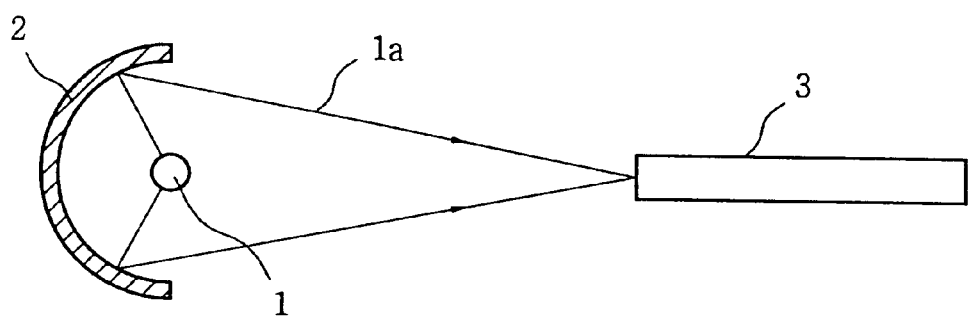
FIG. 1 is a schematic view of a conventional optical device of a liquid crystal projector.
Figure 2:
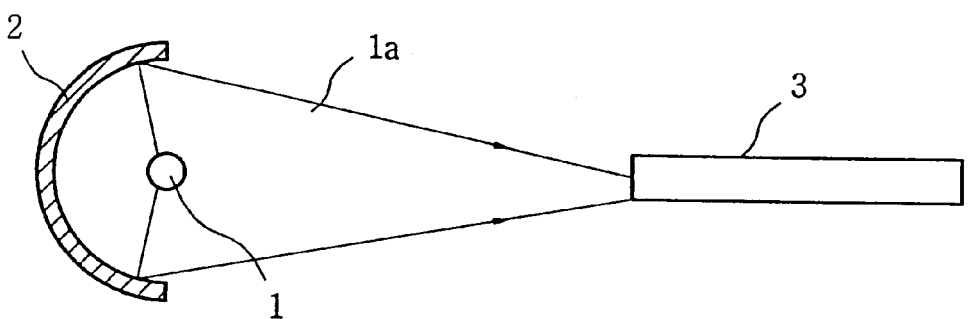
FIG. 2 is a view explaining the minute fluctuation of illuminating light in connection with the conventional device.
Figure 3:
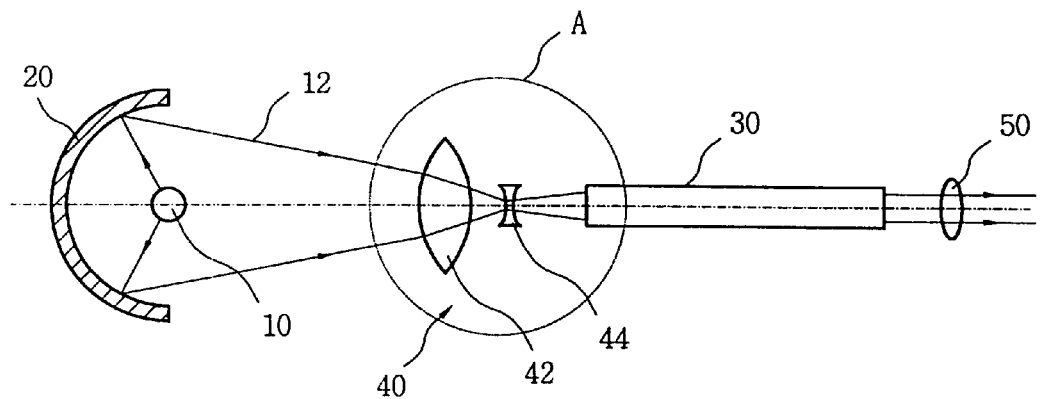
FIG. 3 is a schematic view of a projector with an illuminating light in connection with the present invention.
Figure 4:
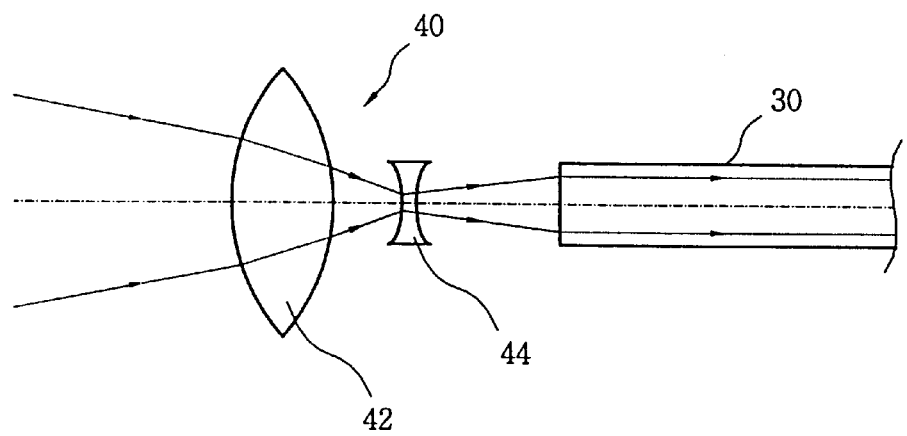
FIG. 4 is a detailed view of section "A" in FIG. 3.

In FIGS. 3 and 4, a hemisphere-shaped reflector 20 is disposed in front of a lamp 10 which emits illuminating light 12 so that the illuminating light 12 is reflected by the reflector 20.

The lamp 10 is a Metal Halide Lamp which generates an arc as a light source.

At the rear side of the lamp 10, a square rod-shaped scrambler 30 which is made of glass is disposed so that the illuminating light 12 reflected by the reflector 20 is directed to and passed through the scrambler 30.

The illuminating light 12 which has passed through the inside of the scrambler 30 is directed to a projection lens 50 to be projected onto the screen via a liquid crystal display panel (not shown).

Elements of the present invention, such as the reflector 20, the lamp 10, the scrambler 30 and the projection lens 50 have arrangements corresponding to those of the conventional device.

An important element of the present invention is an illuminating light collecting unit 40 which is disposed between the lamp 10 and the scrambler 30.

The illuminating light collecting unit 40 serves to collect and diffuse the illuminating light 12 to prevent the occurrence of fluctuation and includes a convex lens 42 for collecting the illuminating light 12 emitted from the lamp 10 and a concave lens 44 for diffusing the illuminating light 12 collected by the convex lens 42 within a predetermined range.

Figure 5:
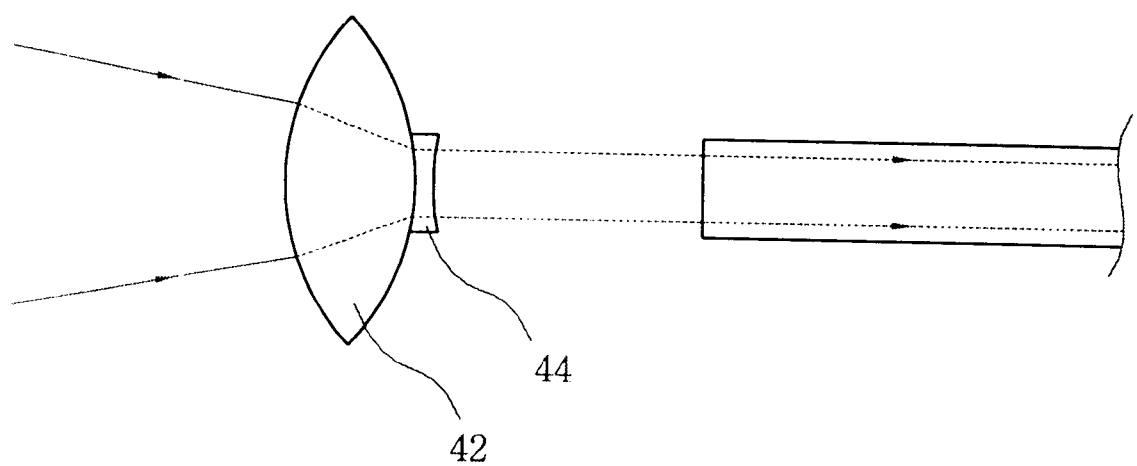
FIG. 5 is a detailed view similar to FIG. 4 but showing an alternative embodiment.

The embodiment of the present invention employs an arrangement wherein the convex lens 42 and the concave lens 44 are disposed separately in order in front of the reflector 20; however, it is preferable that the convex lens 42 and the concave lens 44 are formed to have a combined or single body structure if necessary (See FIG. 5).

Furthermore, it is preferable that the number of lenses is less than three because the total weight of the projector can be reduced.

In the present invention the illuminating light 12 emitted from the lamp 10 is reflected by the reflector 20 and is directed to the convex lens 42 of the light collecting unit 40 to be scaled down in its size.

Therefore, the fluctuation of the illuminating light 12 may be reduced though the lamp 10 shakes minutely.

Next, the illuminating light 12 is directed to the concave lens 44 thereby to be diffused within a predetermined range given to the scrambler 30 so that the illuminating light 12 can be prevented from being deviated from the scrambler 30.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. A projector comprising:

a lamp for emitting illuminating light;

a reflector for reflecting the illuminating light;

a square rod-shaped scrambler for guiding the reflected illuminating light to pass therethrough;

an illuminating light collecting unit, which includes a convex lens for collecting the illuminating light emitted from the lamp and a concave lens for diffusing the illuminating light collected by the convex lens within a predetermined range, for collecting and diffusing the reflected illuminating light in order to prevent the fluctuation of the illuminating light which may occur at a region between the scrambler and the lamp; and a projection lens for projecting the illuminating light which has passed through the scrambler.

2. The projector in accordance with claim 1, wherein said convex lens and said concave lens are separately disposed in order in front of the reflector.

3. The projector in accordance with claim 1, wherein said convex lens and said concave lens are formed to have a single body.

4. The projector in accordance with claim 1, wherein a total number of said convex and concave lenses is less than three.

* * * * *